United States Patent
Rohrbach et al.

[11] 3,901,005
[45] Aug. 26, 1975

[54] FRUIT HARVESTER

[75] Inventors: Roger Phillip Rohrbach, Raleigh, N.C.; Miroslav Rajnoch, Prague, Czechoslovakia

[73] Assignee: Research Corporation, New York, N.Y.

[22] Filed: Aug. 8, 1973

[21] Appl. No.: 386,502

Related U.S. Application Data

[62] Division of Ser. No. 191,194, Oct. 21, 1971, Pat. No. 3,793,814.

[52] U.S. Cl. ........................... 56/330; 141/324
[51] Int. Cl. ............................... A01g 19/00
[58] Field of Search ......... 56/330, 328 R, 329, 327, 56/16.6, 130; 141/35, 324

[56] References Cited
UNITED STATES PATENTS

| | | | |
|---|---|---|---|
| 1,048,597 | 12/1912 | Shephard | 141/35 |
| 3,276,194 | 10/1966 | Mohn et al. | 56/330 |
| 3,325,984 | 6/1967 | Christie et al. | 56/330 |
| 3,557,539 | 1/1971 | Lammel et al. | 56/330 |
| 3,667,202 | 6/1972 | Watts | 56/330 |
| 3,727,388 | 4/1973 | Smith | 56/330 |
| 3,756,002 | 9/1973 | Mecca | 56/330 |

*Primary Examiner*—Louis G. Mancene
*Assistant Examiner*—J. N. Eskovitz
*Attorney, Agent, or Firm*—Harold L. Stowell

[57] ABSTRACT

A high clearance tractor moves over a row of fruit bushes and carries an underslung floating harvester unit which has longitudinally extending flapper means that sets up vibrations in higher order vibrational modes over the entire profiles of the bushes to dislodge mature fruit which is caught about at ground level by catcher means carried by endless conveyors arranged vertically on the outsides of the flapper means, such conveyors running synchronously with the ground speed of the tractor so that the catcher means has zero velocity with respect to both the bushes and the ground. The catcher means conveys the fruit to fruit boxes removably arranged vertically in a cascade arrangement at the sides of the tractor.

17 Claims, 18 Drawing Figures

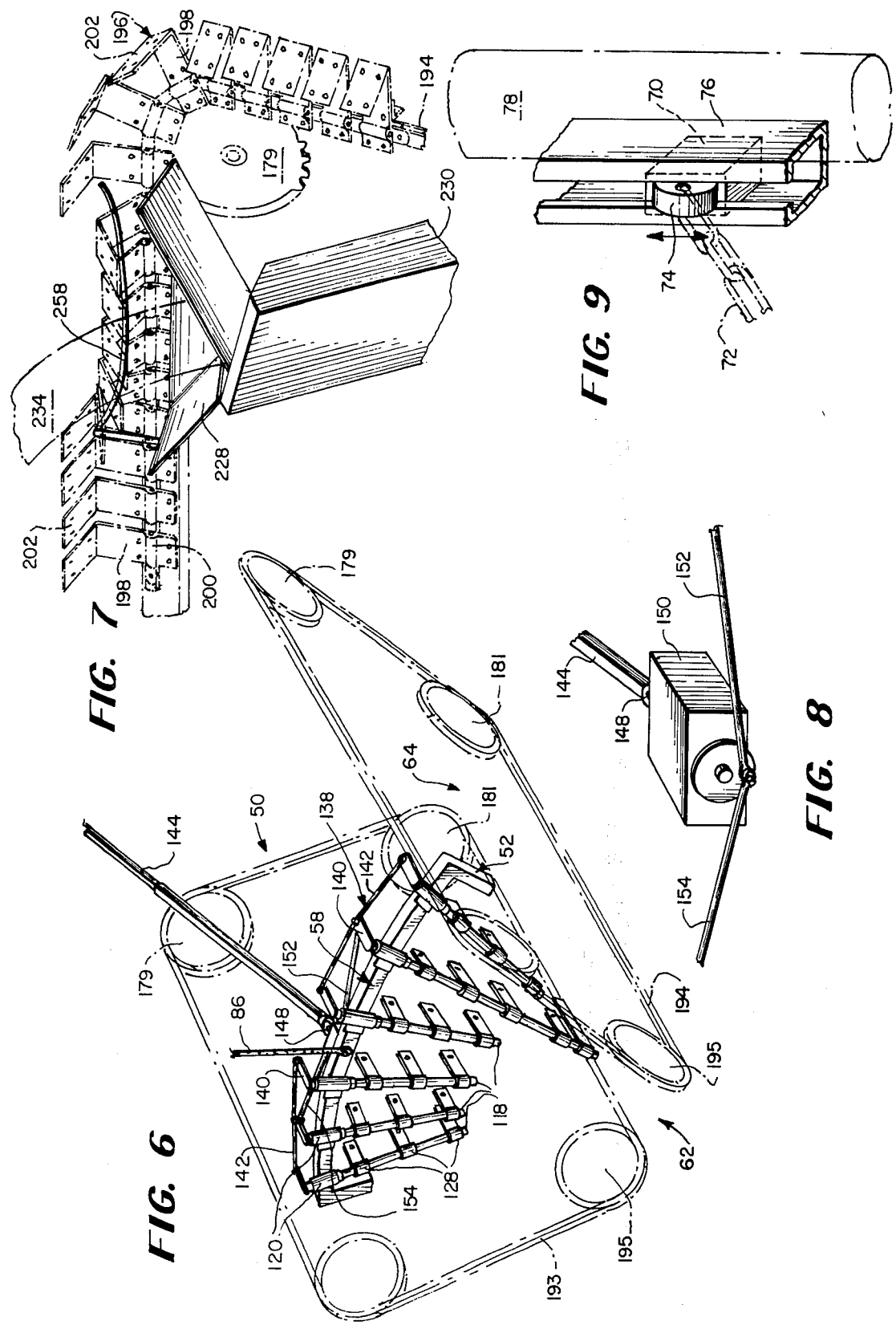

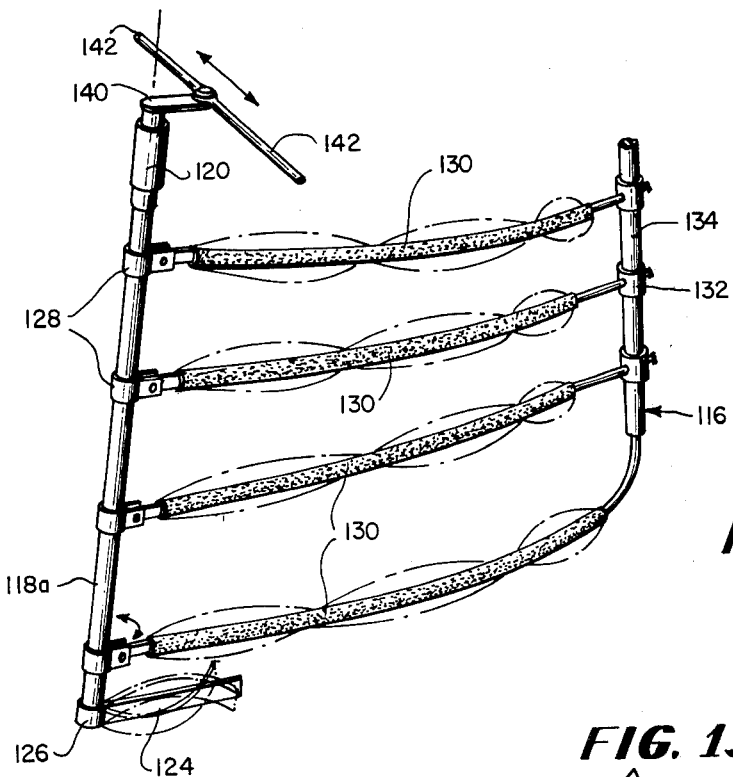
FIG. 12
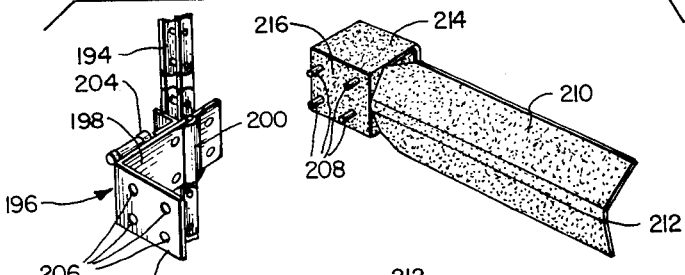
FIG. 13
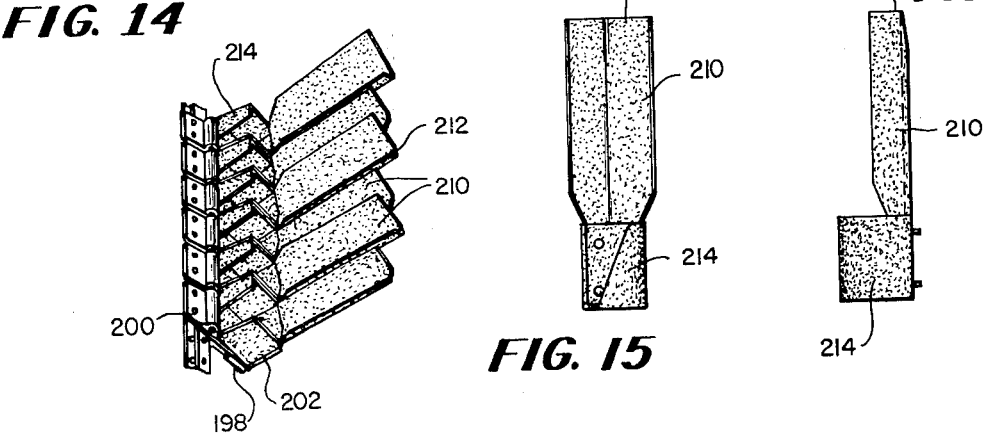
FIG. 14
FIG. 15
FIG. 16

FRUIT HARVESTER

This is a Division, of application Ser. No. 191,194 filed Oct. 21, 1971, now U.S. Pat. No. 3,793,814 issued Feb. 26, 1974.

BACKGROUND OF THE INVENTION

1. Field of the Invention

The present invention generally appertains to improvements in mechanical harvesters and is directed especially to a new and novel method and apparatus for harvesting fruit, such as blueberries, from bushes and also for harvesting fruit from any plant structures, such as harvesting grapes, peaches, apples, etc.

2. State of the Art

Mechanical harvesters have been developed and used for a number of years for bush and tree fruits. Selections for the particular use of a specific type harvester are made based on various factors, such as whether bushes or trees are involved, what the height of such plants, especially the bushes, is, and whether the harvested fruit is to be processed or marketed as fresh fruit. In general, the mechanical harvesters suitable for harvesting high bushes for processing are very costly while the mechancial harvesters suitable for harvesting low bushes are very limited in their use. And mechanical harvesters used for harvesting tree fruits are of such size and operational types as to negate from a cost and operational viewpoint their usage with bush fruits.

The tree fruit harvesters usually are of the shaker type wherein shaker arms engage the limbs and trunk of the tree or else they are of the picker type.

In general, commercially available mechanical harvesters for bush fruits use either special star wheels vibrating about their axes or rigid impacting fingers with a constant stroke to detach the fruit. The star wheels are quite expensive and their rigid spikes are subject to fatigue breakage while the rigid impacting fingers cause heavy damage to older bushes. Both of these mechanisms function unsatisfactorily in certain areas of the bush due to their inherent design.

The catching function in all of such commercially available harvesters is provided by so-called "fish scale closures." These closures have two main faults: (1) they close only around the circumference of the bush, and (2) they must be positioned relatively high from the ground where the circumference of the bush is much larger. Losses of fruit, particularly berries, from this type closure are commonly in the range of 20 to 40%.

Cultural practices will influence the closing function of all machines; the smaller the area of the bush to cover, the smaller the losses. Because of the nature of the bush, what is desired is a device which would close the bush at its smallest area, i.e. the ground, and moreover, its details would intrude into the inner area of the bush.

SUMMARY OF THE INVENTION

In the present invention, the detachment, catching, gathering, elevating, cleaning, and transporting of the fruit are carried out in a novel manner to achieve maximum fruit detachment with minimum damage to both the fruit and the fruit bearing plants.

Detachment of the fruit is achieved by the use of flexible flappers, excited from one end and held rigidly at the other end so that they vibrate in a standing wave type pattern of greater than the fundamental mode. One or more of the lowermost flappers are, however, held only by the lead or exciting end so that there is an end that is able to settle into the lowest areas of the plants and can easily overrun forked canes. The vibrations cover the entire profiles of the bushes. The catching, gathering, and elevating functions are all provided by a pair of finger-bucket belts or chains which run synchronously with the ground so that the fingers have zero velocity with respect to both the bushes and the ground. Conveying of the detached fruit from the base of the plant is provided by buckets mounted integrally with the fingers on the chains or belts. Cleaning leaves and other trash from the free fruit is accomplished with air. Storage of the harvested fruit is provided by a unique cascade arrangement of fruit boxes at the upper reaches of the belts. The filled boxes can be exchanged for empty ones at the end of the row.

The entire harvester unit is mounted easily and simply on a high-clearance tractor in a free floating and adjustable manner and in a way as to minimize steering errors during operation.

The tractor has four high corner posts of which two are at the front and carry steering wheels and two are at the rear and carry drive wheels. Motor means and an operator's station for driving and steering the tractor and for operating the harvester unit with its moving mechanisms are mounted on a horizontal frame supported by the laterally spaced apart front pair of posts and the laterally spaced apart back pair of posts.

The harvester unit is suspended in a floating fashion from the framework and is positioned between the posts in a manner so that it possesses a delimited free longitudinal and lateral movement whereby it is self-alignable with the rows of bushes so as to ensure proper and complete coverage of the bushes with a maximum fruit harvesting and a minimum of damage to the harvested fruit and the plants. In order to accommodate the unit to low and high bushes and to trees of various heights the harvester unit is also mounted for vertical adjustment so that it can be suspended from the tractor at various ground level heights. The harvester unit is suspended on its centerline by cables which are attached to a hydraulic cylinder for raising and lowering the harvester units. The cables are spring loaded so as to provide a vertical floating action of the harvester unit. Control of the harvester unit is maintained by chains so placed as to constrain but not rigidly limit such floating action.

The flappers include flexible elements that extend longitudinally with respect to the tractor and are arranged in a laterally spaced pattern to ensure complete coverage of the plants. The flexible elements have their front ends carried by generally vertical actuating or excitation shafts or arms while their rear ends are fixed in vertical support arms except that one or more of the lowermost flexible elements is of shorter length and has its rear end free.

The excitation shafts of the flapper mechanism are mounted in bearings only at their upper ends with the lower ends being free. They are positionable in height, slope and mutual spacing so as to minimize the resistance of moving through the bush while providing complete coverage of the entire bush profile.

The flexible elements are caused to vibrate along their long axes in a whip-like manner and set up vibrations in the first and/or higher order vibrational modes.

The excitation shafts are oscillated about their centerlines within about 35° by a reciprocating motion applied from a master control crank arm. This motion causes the flexible elements rigidly attached at their rear ends to the fixed support arms to vibrate. The single-end supported flexible flapper element is induced to vibrate in a rather random pattern suitable for fruit detachment in the lower areas of the bush.

The belts or chains are arranged on the outsides of flappers and extend longitudinally with respect to the tractor inwardly of the front and rear posts and are inclined upwardly and outwardly. The chains are driven by the same drive that powers the drive wheels of the tractor so that they move in synchronism with the tractor's movement and rate of ground speed. The chains support a series of spring loaded semi-rigid fingers which lay into the crown areas of the plants at generally right angles to the row and have inner bush engaging tips that are elevated so as to cause the dislodged fruit to move by gravity along the fingers and into cups or buckets at the outer ends of the fingers.

In the front of the harvester, the fingers are bent backward by virtue of appropriate guides so that a larger entry cross-sectional opening into the harvester is generated. At the bottom reaches the fingers are allowed to spring into their unstrained position to form a closure around the plant material.

The buckets elevate the fruit to the top horizontal reaches of the belts which have vertical front and rear reaches and horizontal top and bottom reaches. The fingers capture the fruit at the bottom reaches which is at or near ground level and carry the captured fruit up to the top reaches where it is deposited into a storage box arrangement provided on each side of the tractor.

Such storage box arrangement comprises a series of fruit boxes arranged in a vertically overlying series with the lowermost boxes having ends extending beyond the uppermost lugs and with the boxes being somewhat inwardly inclined starting from the top to the bottom box in the series. The delivery from the conveyor buckets is made into the top box through a chute, which has suction fans communicated therewith for vacuuming off leaves, dirt and other debris. The overflow from the top box cascades to the next lower box through a series of chutes on the end of the top box and when the next lower lug fills up the overflow therefrom cascades to the next lower box via a series of chutes on the extending end until all of the box are filled which usually coincides with the end of the harvesting of a row of bushes. At this point the filled boxes are removed and empty lugs are positioned on the inclined supporting tracks carried by the tractor framework.

A primary object of the present invention is to provide a method of harvesting fruit from bushes or trees which involves the creation of vibrating standing wave type patterns of greater than the fundamental mode over the entire profile of a bush to effect effortless and damage-free dislodgment of the fruit from the bush; catching, gathering and elevating the detached fruit by conveyor means that closely engages the bush at or near ground level and intrudes into the inner areas of the bush without damage to the bush or to the captured fruit with the conveyor means running synchronously with the ground; and depositing the fruit, while cleaning it, into a cascade arrangement of fruit boxes which can be replaced by empty ones when they become full.

Another primary object of the present invention is to provide a simple, easily operated and controlled fruit harvester that can be moved over rows of fruit laden bushes or trees with provision being made for compensating for steering errors and for ensuring of proper row alignment and with the fruit being detached, gathered, cleaned and deposited into storage boxes on the harvester in a manner that achieves maximum fruit harvesting with a minimum of damage to the fruit or the fruit carrying plants.

Additional objects of the present invention are:

1. to detach mature fruit from the parent plant structure by the use of flexible flappers, excited from one end and held rigid at the other end, which generally vibrate in higher order vibrational modes;

2. to detach mature fruit from the lower areas (nearer the ground) of the parent plant structure by the use of flexible flappers and/or semi-rigid flappers, excited from one end and free at the other end, which vibrate in the first and/or higher order vibrational modes;

3. to catch the detached fruit at the ground level by the use of a series of semi-rigid fingers which lay into the crown area of the plant or nearly right angles to the row, with the tips elevated so as to cause the fruit to move by gravity to cups at the other ends of the fingers;

4. to elevate the fruit by the series of buckets or cups which are located at the ends of the fingers;

5. to store the harvested fruit on the machine in boxes by placing the empty fruit boxes so that the harvested fruit enters the top box and fills it until the overflow cascades down to the next lower box and, 6. to float the entire harvester unit so as to minimize steering errors by allowing semi-rigid guides to position the unit with respect to the base of the plant.

BRIEF DESCRIPTION OF THE DRAWINGS

FIG. 6 is a perspective view of the flapper means showing the front or excitation end thereof in detail.

FIG. 7 is a fragmentary perspective view of a dumping mechanism for the conveyor carried buckets as they deposit the conveyed fruit into the boxes.

FIG. 8 is a fragmentary perspective view of the master control crank arms that are driven to impart oscillatory movements to the excitation or actuating shafts of the flapper means.

FIG. 9 is a fragmentary perspective view of the mounting arrangement for the lateral restraint chains provided for the harvesting unit with the side chains being anchored to the tractor frame by the vertical fixed track and free wheel so that the side chains can accommodate vertical adjustment of the unit.

FIG. 12 is a perspective view of one of the units of the flapper means.

FIG. 13 is an exploded perspective view of one of the conveyor fingers and its mounting arrangement on the conveyor belt.

FIG. 14 is a fragmentary perspective view of a portion of the conveyor belt and the fingers carried thereby.

FIG. 15 is a top plan view of one of the fingers showing the tip on one end and the cup or bucket on the other end.

FIG. 16 is a side elevational view of the finger of FIG. 15.

DESCRIPTION OF THE PREFERRED EMBODIMENT

Figure 1:
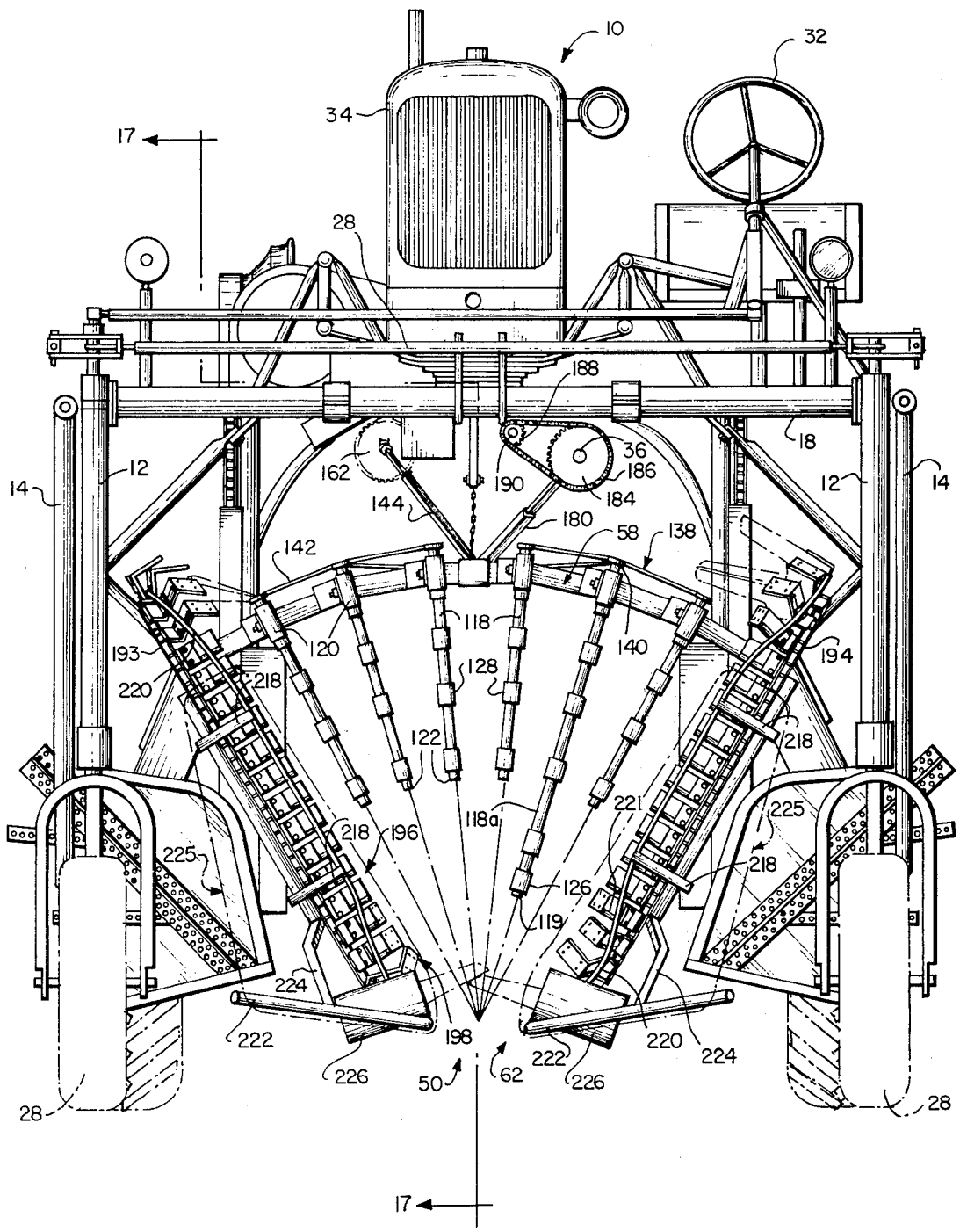
FIG. 1 is a front end elevational view of the harvester of the present invention.

Referring now more particularly to the accompanying drawings, the reference numeral 10 generally designates a high clearance tractor which has a pair of laterally spaced apart front corner posts 12 and a pair of laterally spaced apart rear corner posts 14. The front and rear posts on each side are interconnected by side frames 16 and the front posts are connected by a cross framing 18 with the rear posts being connected by a cross framing 20. A horizontal platform 22 is supported at the tops of the side frames and provides a mounting platform and operator's station 24.

Figure 4:
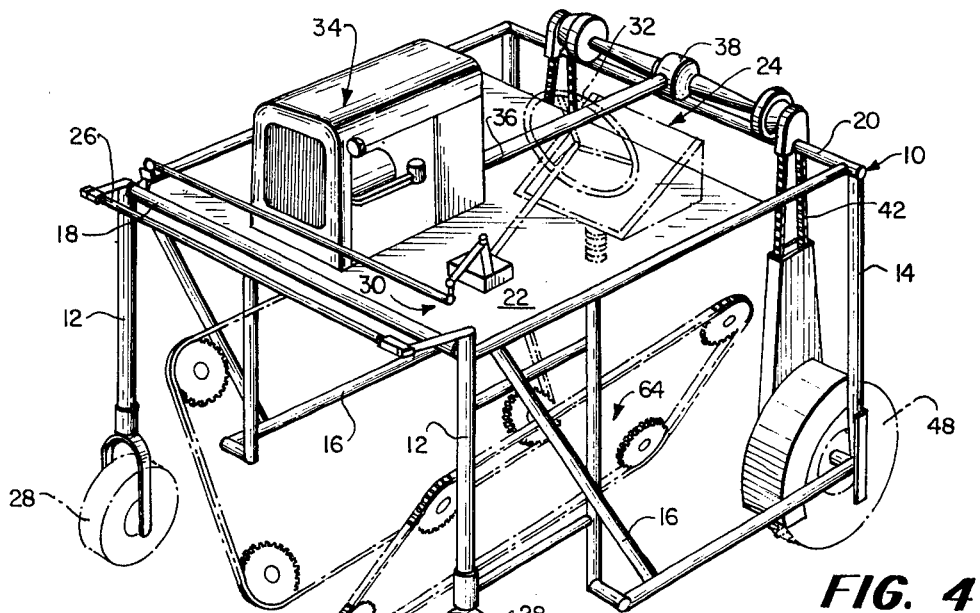
FIG. 4 is a perspective view of the tractor and framework with the conveyor belts diagrammatically shown.

The front corner posts are tubular and support rotatable rods that are connected at their upper ends, as shown in FIG. 4, by a tie rod 26 and carry ground wheels 28 on their lower ends. A steering linkage 30 is connected from a steering wheel 32 at the operator's station 24 to the tie rod 26.

An internal combustion engine 34 is mounted on the platform 22 and connected by a drive shaft 36 to a differential housing 38 on the rear drive shaft assembly 40 which carries sprockets on its opposing ends for driving vertical drive chains 42 that are connected to sprockets 44 on the stub axles 46 supported by the lower ends of the rear posts and carrying ground engaging drive wheels 48. The engine controls (not shown) are conventional and are accessible from the operator's station 24.

The high clearance tractor is of a height so that it can pass over the tops of plant structures, like bushes, whether short or tall, and trees. The platform 22 clears the tops of such plant structures as the corner posts or legs straddle the rows of bushes or trees with the rows being passed over at about the longitudinal center line of the tractor.

A harvester unit 50 is disposed within the lateral and longitudinal space between the corner posts and suspended from the platform 22 and associated frameworks so that the unit is underslung below the tractor frame and is positioned to perform all of the harvesting functions on the bushes or trees as the tractor is driven thereover. The harvester unit, as shown more clearly in FIGS. 5 and 6, includes a framework 52 which has opposing side frames 54 and 56 that are connected at their ends by front and rear cross head frames 58 and 60. The side frames are declined in their longitudinal placement so that the framework has a substantial V-shaped lengthwise appearance with the frames being formed of tubular vertical and longitudinal bars. The frames are open and of light weight but rigid construction.

The framework is mounted for delimited lateral and longitudinal movement so that the front and rear bottom open spaces 62 and 64, especially the front, can self-align with the rows of bushes or trees. In this respect, the open spaces 62 and 64 at the front and rear of the lower spaced apart and inclined edges of the side frames provide an entrance and exit for a longitudinal passageway 66 between the inner confronting and declined side edges of the side frames which pass on opposite sides of the bushes in a row.

Figure 3:
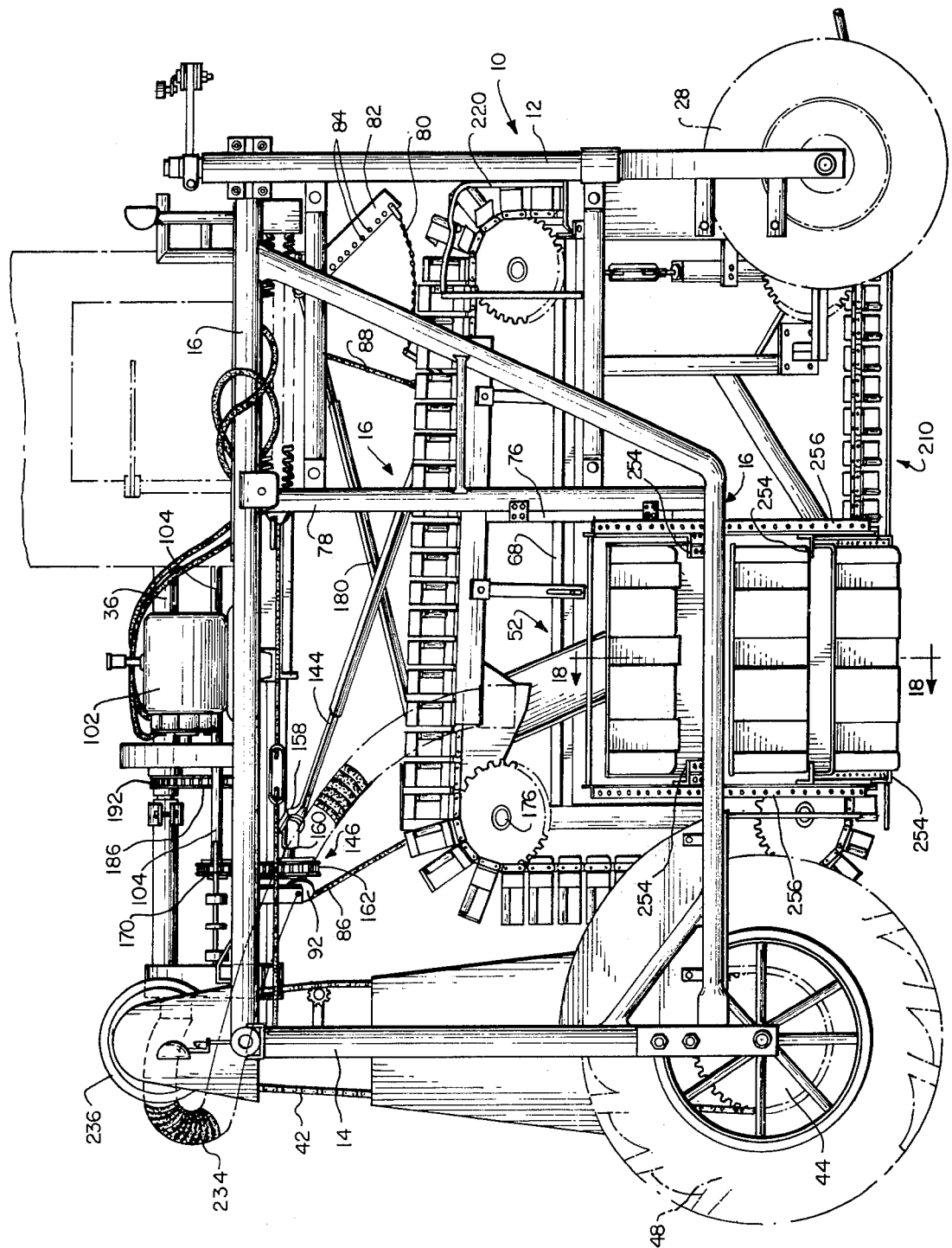
FIG. 3 is a side elevational view thereof.

The longitudinal top bars 68 of the side frames carry anchor blocks 70 to which generally horizontal chains 72 are attached with the chains extending laterally outwardly from the side frames and being carried at their outer ends by rollers 74, as shown in FIG. 9. The rollers 74 slide in vertical tracks 76 which are fixed to the vertical bars 78 of the opposing side frameworks 16 of the tractor as shown in FIG. 3. The purpose of the rollers is to accommodate vertical adjustment of the harvester unit, as will be described. The generally horizontal side chains limit lateral sway of the harvester unit.

Longitudinal swaying or floating action of the unit is delimited by a vertical drag chain 80, as shown in FIG. 3. The chain 80 is connected between the front cross head frame 58 and a bar 82 that depends forwardly from the tractor platform 22. The chain 80 has its upper end provided with a catch that can lockingly fit in a selected hole in the spaced series of holes 84 provided in the bar 82 with such selective attachment of the end of the chain being provided to accommodate gross vertical adjustment of the harvester unit. The drag chain provides the necessary force to slide the harvester unit down the rows.

Figure 5:
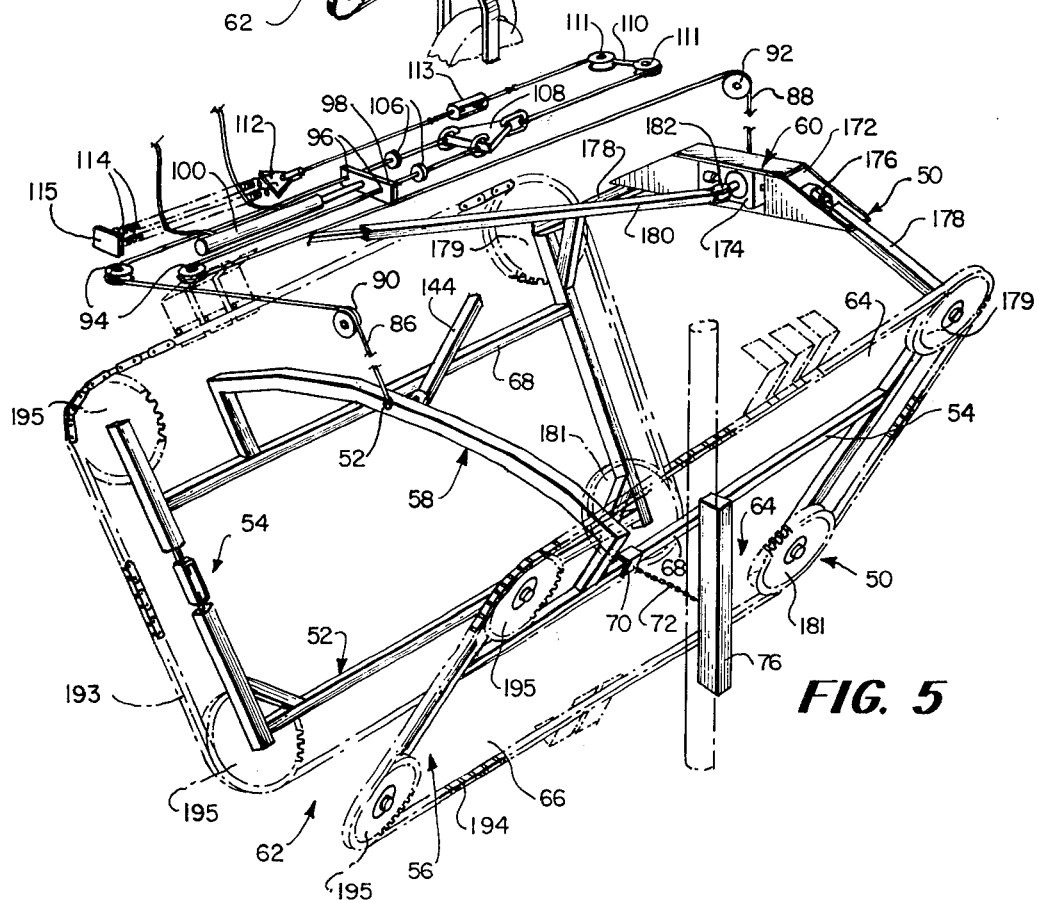
FIG. 5 is a perspective showing of the suspension and mounting arrangement for the harvester unit with only the framework for such unit and the conveyor belts being shown, the latter being diagrammatically illustrated.

The harvester unit is supported in its suspended position from the underside of the tractor platform 22 by front and rear spring loaded cables 86 and 88 which are disposed at the longitudinal center line of the harvester framework 52 and which provide a vertical floating action of the harvester unit. As shown in FIG. 5, the front cable 86 is attached to the center of the front cross head 58 while the rear cable 88 is attached to the center of the rear cross head 60. The cables 86 and 88 are entrained over front and rear idler pulleys 90 and 92 which change their vertical extension into converging horizontal paths. The cables are sheaved over a pair of side by side pulleys 94 at the front of the framework that dispose the cables in a side by side parallel arrangement. The cables pass through suitable openings 96 in a common actuator plate 98 with the plate having the ram of a hydraulic cylinder 100 fixed thereto. The cylinder is carried by the framework and is controlled by a hydraulic motor 102, shown in FIG. 3, which is powered by a power take-off shaft 104 from the engine 34. The ram actuates the plate 98 that acts on the cables through stops 106 fixed on the cables. The cables are attached to a common free plate 108 from which a single cable 110 extends for connection in its passage around guide pulleys 111 to a free plate 112 which has coil springs 114 attached thereto. The springs 114 are anchored to an anchor plate 115 fixedly carried by the tractor framework. The cable 110 is provided with an adjustment turnbuckle 113. Actuation of the hydraulic ram will raise or lower the harvester unit with the springs 110 functioning to float the harvester.

Figure 2:
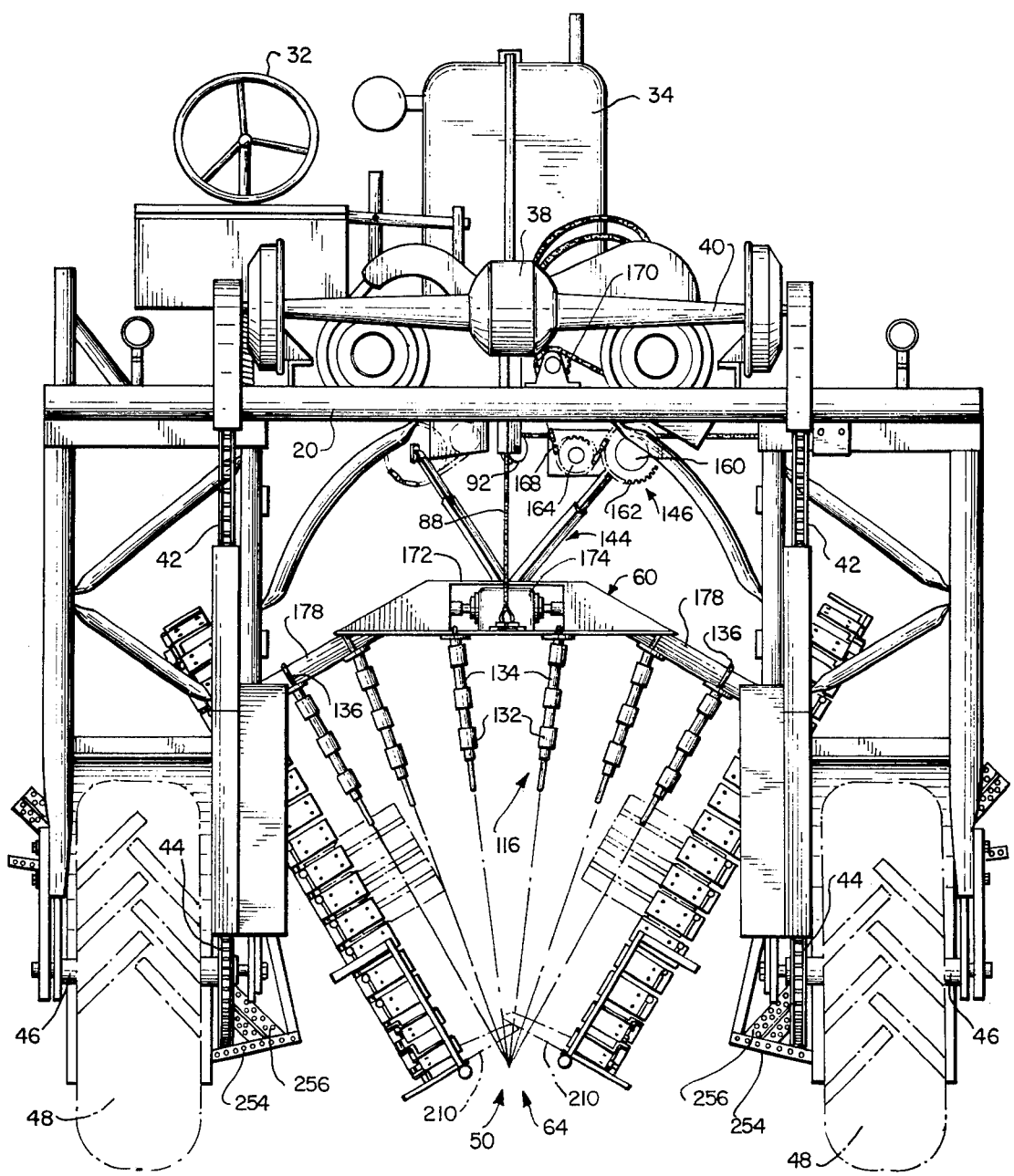
FIG. 2 is a rear end elevational view thereof.

The front and rear cross heads 58 and 60 of the harvester unit framework 52 support a flapper means 116 which is shown in FIGS. 1, 2 and 6 and in more detail in FIG. 12. The flapper means 116 includes a plurality of excitation or actuation shafts, 118 as shown in FIG. 6, that are journaled for rotation in vertical bearing collars 120 carried in a spaced apart inwardly sloped arrangement by the front vertical face of the front cross head 58. The collars are arranged in an inwardly disposed angular relationship so that the mounted shafts 118 lie in a declined plane that generally intersects the front opening 62 of the passageway 66 with the shafts having outer ends 122 that lie in a common radius around the top of the opening and with the shafts being inwardly directed so that imaginary downward prolongations thereof would intersect at the passageway opening, as is clear from FIGS. 1 and 3. All shafts have lower telescopic end portions of which one, shaft 118a, is shown with its lower end portion 119 extended outwardly. Such lowermost axially projecting portion 119 of the shaft 118a has a short semi-rigid or flexible vibratory or flapper arm 124 fixed thereon by a collar 126 and extending rearwardly therefrom. All of the shafts have mounting collars 128 fixed thereon in vertically spaced relation. The front ends of elongated flexible flappers 130, such as lengths of heavy rubber or other flexible hoses or the like, are fixed to the collars 128 whereby the front ends of such flappers or flexible elements are anchored to the shafts which are journaled for rotary movement. The elongated flappers 130 are arranged longitudinally in a vertically spaced pattern on each shaft, as shown in FIG. 12, and have their rear ends fixedly anchored by connecting collars 132 to fixed arms 134 that depend from the rear cross head 60, as shown in FIG. 2. The arms 134 are securely anchored by clamp assemblies 136 to the rear cross head so that they are in a fixed arrangement with the supporting cross head and fixedly hold the rear ends of the flexible flappers. The fixed arms are disposed in a complementary pattern to the front actuation shafts with the arms 134 being in longitudinal paired alignment therewith.

The excitation shafts 118 are adjustable in height, slope and mutual spacing so as to minimize the resistance of moving through the bush while providing complete coverage of the entire bush profile and the rear arms 134 can be adjusted to stay in alignment and complementary relationship with their counterpart shafts 118.

Each of the excitation shafts 118 is oscillated about its axis within about 35° by a reciprocating means 138 which includes control arms 140 fixed to the upper ends of the shafts and connected together by tie rods 142. A pair of tie rods is provided, as shown in FIG. 6, and the rods are pivoted to the arms in two sets so that the arms and their shafts oscillate in a common movement. As shown in FIGS. 6 and 8, a telescopic, noncircular drive shafting 144 extends downwardly and forwardly from a drive transmission unit 146 as shown in FIG. 2, at the rear of the tractor frame. The drive shafting 144 is telescopic to adjust to the movement of the harvester frame and is connected by a universal joint 148 to a gear box 150 carried by the front cross head and driving eccentrically mounted crank arms 152 and 154 which are reciprocatingly pivotally attached to the rods 142 to produce the common oscillatory movements of the excitation shafts 118.

As the excitation or actuation shafts 118 are oscillated they produce a vibratory action of the flexible flappers 130 along their longitudinal axes as shown in FIG. 12. The flappers 130 which are excited from their front ends to the oscillatory shafts 118 and are held rigid at their rear ends, vibrate in higher order vibrational modes. The semi-rigid flapper arm 124, of which only one is shown but of which there could be several, is excited from its front end attached to the oscillatory shaft 118a and is free at its rear end and vibrates in the first and/or higher order vibrational modes. The flexible flappers 130 cover the entire profile of the plant structure and vibrate in a standing wave type pattern of generally greater than the first mode over the entire profile of the plant structure. The lowermost flapper arm 124 is able to settle into the lowest areas of the plant structure and can easily overrun forked canes.

The drive transmission unit 146 includes a chain and sprocket drive arrangement 156 but it could be a gear train. The chain and sprocket drive transmission unit 146 transmits the drive to the shafting 144 from the power take-off shaft 104, as shown in FIGS. 2 and 3. The end of the shafting 144 is connected by a universal joint 158 on a stub shaft 160 carrying a sprocket 162 which is connected by a chain to a sprocket 164, as shown in FIG. 2, that is connected by a chain 168 to a sprocket 170 on the power take-off shaft 114.

The rear cross head 60 has a center section 172 which carries a gearing in a gear box 174 and has end sections 176 within which shafts 178 are rotatably housed. The shafts 178 are rotatably powered by the gearing in the gear box 174 which is driven by a drive shafting 180. The shafting 180 is of non-circular or square tubing in telescopic assembly so as to accommodate the movements of the harvester unit framework as is the case of the shafting 144. The drive shafting 180 is driven by the drive shaft 36 for the rear wheels of the tractor so that the drive of the shafting 180 is synchronized with the drive of the tractor wheels. The shafting 180 is connected by a universal joint at its forward end to a sprocket 184 which is connected by a chain 186, as shown in FIG. 1, to a small sprocket 188 on an elongated shaft 190. The shaft 190 extends longitudinally below the tractor platform 22 and is connected by a chain and sprocket drive connection 192, as shown in FIG. 3, directly to the drive shaft 36.

The shafts 178 are in outwardly declined positions and carry sprockets 179 on their outer ends with such sprockets lying in inclined planes above lower idler sprockets 181. The sprockets 179 and 181 support endless chains 193 and 194 with idler sprockets 195, that are rotatably supported by the upper end lower front ends of the side frames 54 and 56, as shown in FIG. 5, supporting the front ends of the chains 193 and 194.

The chains travel in inclined planes paralleling the placement and positioning of the side frames 54 and 56 and running therealong on the outsides of the flapper means. The endless chains are driven by the sprockets 179 via the drive connection 192 and the shaft 190 from the drive shaft 36 for the drive wheels of the tractor and have upper and lower horizontal reaches and front and rear vertical reaches.

Each of the chains is provided with a series of adjoining right angular mounting plates 196, as shown in detail in FIG. 13. The link of each chain has one angular flat portion 198 of a plate 196 fastened thereto by an internally spring loaded hinge connection 200. The plate portion 198 normally extends outwardly of the chains. The outer plate portion 202 is fixed at a substantial right angle to the hingedly mounted plate portion 198 and normally extends inwardly of the chains towards the flapper means and perpendicular to the paths of the running chains. The spring loaded hinge connection normally retains the angular plates in the associated carried position relative to the running chains in which the inner plate or hingedly anchored end portion 198 extends straight outwardly from the chains in the same plane as the chains while the outer angular plate portion or free end extends substantially perpendicularly from the chains inwardly towards the flapper means.

The outer plate or free end portion 202 is formed with openings 206 to receive mounting screws 208 carried by semi-rigid fingers 210 whereby the fingers, as shown in FIGS. 13 to 16, are mounted on the chains. Each of the fingers is of trough shaped configuration or substantially V-shaped in cross-section. The fingers have outer open tips 212 while the elongated body portions are of a trough-like appearance and have inner ends 214 in the form of buckets or cups. The cups 214 have bottom walls 216 from which the mounting screws 208 project so that the cups are fixedly seated on the plate portions 202 with the top and outer wall of the cups being open. The outer wall is open to communicate with the inner ends of the trough-like fingers which have their angular walls projecting outwardly from the cups and terminating in the open tips 212. The fingers and their inner cups are carried by the chains so that in their passage along the bottom reaches they are below the chains and face upwardly while in their passage along the top reaches they are above the chains and face downwardly.

In the passage of the fingers on the chains 193 and 194 along the bottom reaches of the chains, as shown in FIGS. 1 and 2, it can be appreciated that due to the inclined placement of the chains and the mounted arrangement of the fingers 210, that the tips of the fingers are elevated and that the fingers lay into the crown area of the plant structure at nearly right angles to the row. The fingers not only intrude into the plant structure but the fingers on the opposing chains effect a complementary closure action under the plant at or near ground level. This, plus the inclination of the fingers, insures complete capture of the detached fruit without damage thereto or to the plant structure. The elevated tips of the fingers causes the fruit to move by gravity to the cups 214.

Before the fingers assume their closed relationship in their travel along the bottom reaches of the chains and as they travel along the front vertical reaches they are caused to swing inwardly so that a larger cross-sectional entry opening above the front opening space 62 is produced. In this respect, the front ends of the side frames 54 and 56 support rigid arms 218 which support a cam track 220 on which rollers 204 carried by the inner plate portions 198 slide, as shown in FIGS. 1 and 13. The track 220 causes the plates to swing inwardly about their hinges 200 and move the fingers 210 inwardly out of their normal perpendicular positions to the planes of the chains. As the fingers move into the bottom reaches, they are allowed to spring back into their unstrained positions to form a closure on the base of the plant structures.

The front ends of the side frames 54 and 56 also support guide bars 222 which are disposed in advance of the frames at their front ends and lie substantially horizontal. The guide bars are connected by rigid arms 224 to the fronts of the side frames, as shown in FIG. 1, and carry ski plates 226 positioned below the bottom reaches of the moving fingers and their carrier chains, so as to slide the harvester unit over the ground surface. Shields 225, shown in phantom line, for the cam tracks and the front ascending reaches of the chains are provided and are attached to members 222 and 218, as shown in FIG. 1.

Figure 11:
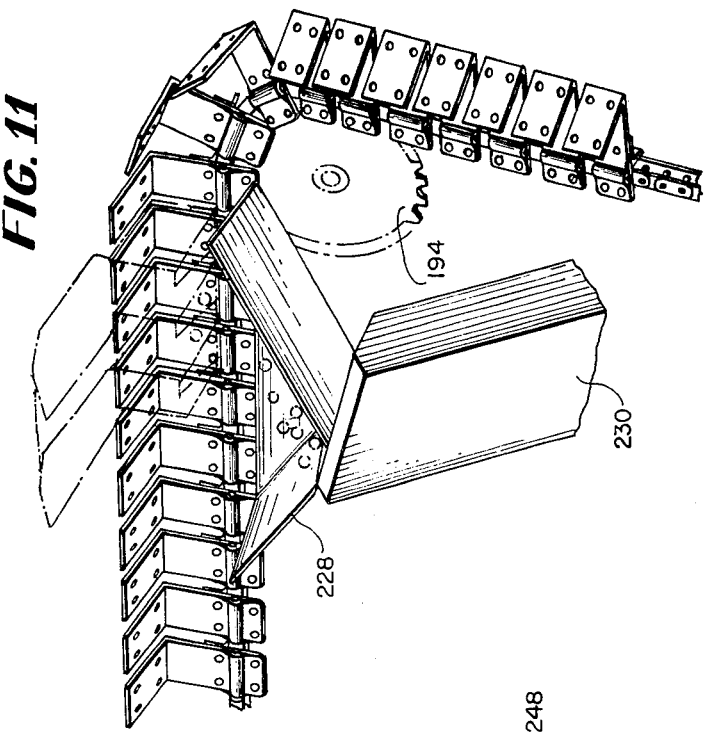
FIG. 11 is a fragmentary perspective view of the dumping or depositing arrangement of the conveyor buckets.
Figure 10:
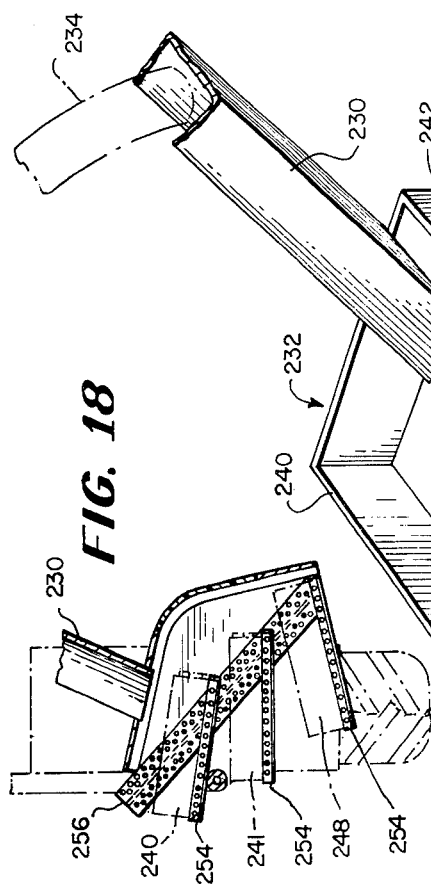
FIG. 10 is a perspective showing of the boxes in their cascade arrangement.
Figure 17:
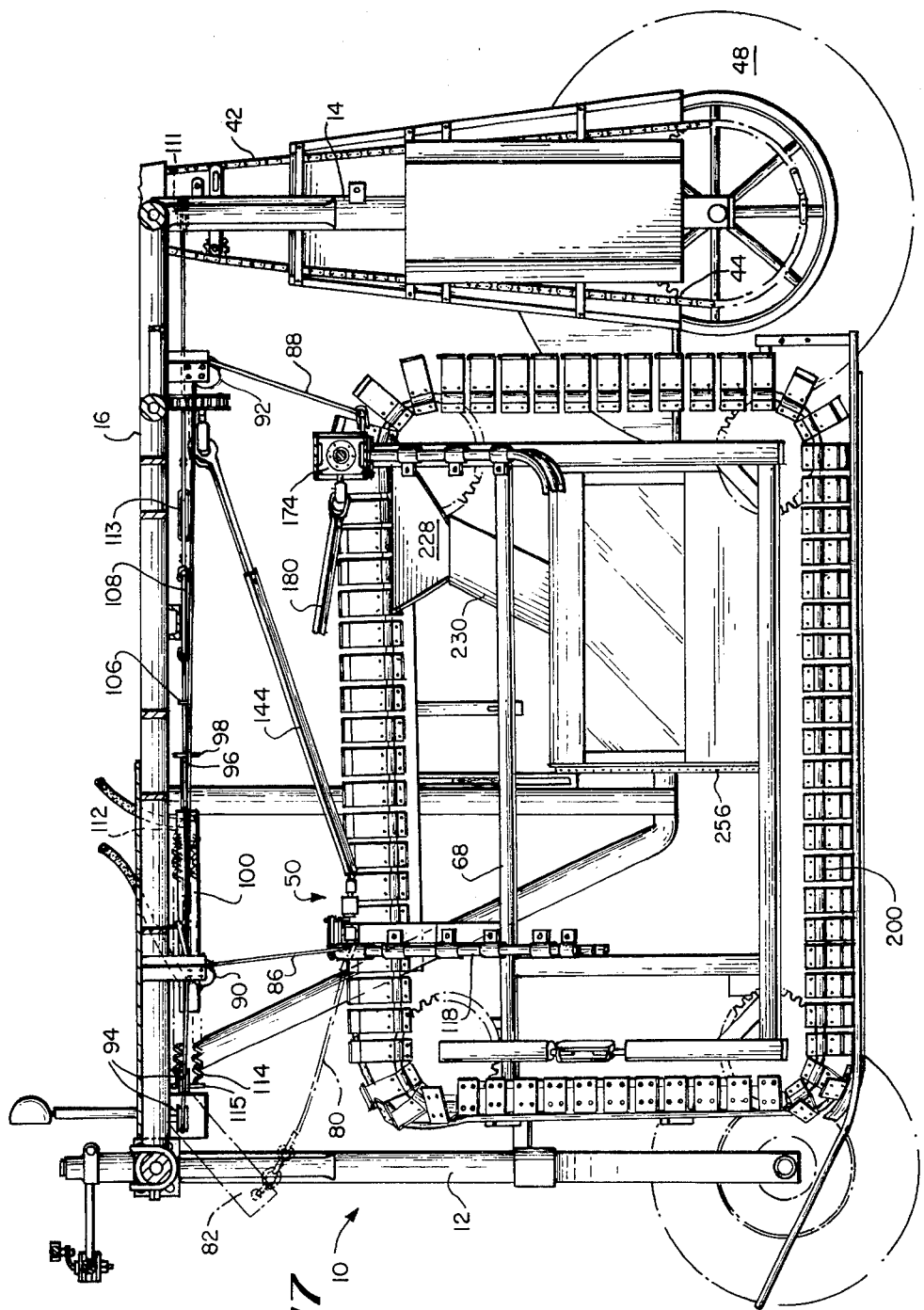
FIG. 17 is a longitudinal vertical sectional view taken on line 17—17 of FIG. 1 and showing the supporting and lifting mechanism for the harvester unit.

The cups fill up with the dislodged fruit in the movement of the fingers with the bottom reaches of the chains and convey the caught fruit up the rear reaches to the top reaches where the fingers and cups become inverted or assume an upside down position so that the captured fruit is dumped out of the cups. The fruit is dumped into a receiver trough 228 immediately as the chains move around and over the upper rear drive sprockets 179, as shown in FIG. 11. The trough communicates with a chute 230 that leads into a vertical series of boxes 232, as shown in FIG. 10.

A flexible air hose 234 is disposed above each V-shaped trough and has its open outer free end extending therein, as shown in FIG. 11. A hose is provided for each trough on each side of the frame below the upper reach of each chain and the hoses extend from fans 236, as shown in FIG. 3. The fans are powered by a connection 238 from the power take-off shaft 104 and create a suction in the troughs to vacuum off leaves, dirt and other debris as the fruit is deposited from the over-turning cups into the troughs.

The boxes are arranged in a cascade pattern wherein the top box 240 is inclined inwardly and downwardly and has its inner end 242 spaced outwardly of the inner end of the next lowermost box 244 and disposed over the insides of such lowermost box 244. The inner end wall 242 is provided on its outer face with a series of inclined vertically staggered plates 246 that constitute a chute in which the overflow fruit from the top box gravitates in a slow damage-free movement down into the next lowermost box 244. The lug 244 overlies the lower lug 248 in the same way as it is overlied by the top box and its inner end wall 250 has a series of chute plates 252.

Figure 18:
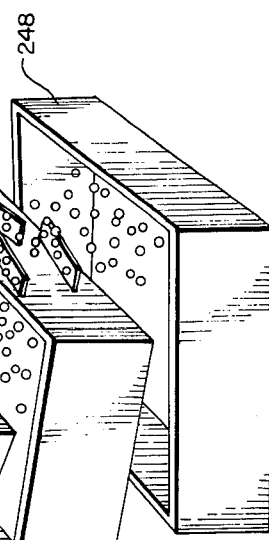
FIG. 18 is a vertical sectional view taken on line 18—18 of FIG. 3 and showing the mounting arrangement for the boxes.

When all of the boxes becomes full, which is usually at the end of a row run by the harvester, the full boxes are removed and replaced by empty ones. As shown in FIGS. 3 and 18, the boxes are slidably supported on trackways 254 carried by support plates 256 attached to the side frames 16 of the tractor. The trackways for the uppermost boxes are disposed in inclined planes that decrease to the horizontal from the top to the bottom trackway which is substantially horizontally disposed.

While the upside down positioning of the cups 214 as the chains pass over the sprockets 179 and start the initial movement of the top reaches should be sufficient to cause the gravitational dislodgement of the fruit from the cups, as shown in FIG. 11, a deflection rod 258 can be provided, as shown in FIG. 7. The deflection rod is arcuate and has upturned outer and inner ends. It overlies the mouth of the trough 228 and the outer faces of the outer plate portions 202 are caused to slide thereunder and to swing the plates down and cause the fingers to incline towards the mouth of the trough. This will position the cups in a declined placement over the trough and such downward deflection will assist the gravitational fall of the fruit and ensure that the entire contents of each cup are dumped into the trough.

It is believed that the operation of the harvester will be quite apparent to those skilled in the art in the light of the foregoing description taken in conjunction with the Summary of The Invention and the accompanying drawings so that a detailed description of the operation will be omitted. Of course, it is to be understood that the foregoing description is merely of the preferred embodiment and that such description and the Abstract of the Disclosure are not to be considered limitative of the invention which is to be construed only within the spirit and scope of the appended claims.

What is claimed is:

1. A harvester for harvesting fruit from a plant structure, such as a bush or tree, comprising a mobile frame adapted to move along a row of plant structures, means carried by said frame for generating a vibratory wave pattern over the plant structures to dislodge mature fruit therefrom, means carried by said frame for catching the falling fruit and conveying it up from the plant structures and a storage means carried by the frame and into which the fruit is deposited by the conveying means,
   wherein said mobile frame is a high clearance self-propelled and steered tractor that moves in a straddling fashion over the plant structures,
   wherein said harvester includes a supporting frame unit carrying the wave generating means and the catching and conveying means, and means floatingly suspending said supporting frame unit centrally of and from the tractor frame,
   wherein said wave generating means includes flapper means carried by the frame unit and extending in a laterally spaced serial arrangement longitudinally of the frame unit and the tractor, and
   wherein said flapper means includes a front vertical series of oscillatory actuation shafts and a rear vertical series of fixed arms carried by the frame unit and longitudinal flexible elements connected between the shafts and the arms with the elements having front ends attached to and excited by the oscillatory movements of the shafts and having rear ends fixedly held by the arms.

2. The invention of claim 1 wherein said tractor frame carries a drive engine for the tractor and driving means is connected between said engine and the shafts for commonly oscillating the shafts as the tractor moves over the plant structures.

3. The invention of claim 2 wherein the shafts are of different graduated vertical lengths and the arms are of similar graduated differing vertical lengths and are arranged in paired alignment longitudinally of the frame unit with the shafts.

4. The invention of claim 1 wherein said catching and conveying means includes a pair of endless conveyors arranged vertically on opposite sides of the flapper means and fingers carried by the conveyors and extending inwardly therefrom toward the plant structures.

5. The invention of claim 4 wherein said conveyors include endless chains that lie in upwardly and outwardly inclined planes and have bottom and top longitudinal reaches and front and rear vertical reaches and said fingers are carried by the links of the chains in contiguously adjoining fashion.

6. A harvester for harvesting fruit from a plant structure, such as a bush or tree, comprising a mobile frame adapted to move along a row of plant structures, means carried by said frame for generating a vibratory wave pattern over the plant structures to dislodge mature fruit therefrom, means carried by said frame for catching the falling fruit and conveying it up from the plant structures and a storage means carried by the frame and into which the fruit is deposited by the conveying means,
   wherein said mobile frame is a high clearance self-propelled and steered tractor that moves in a straddling fashion over the plant structures,
   wherein said harvester includes a supporting frame unit carrying the wave generating means and the catching and conveying means, and means floatingly suspending said supporting frame unit centrally of and from the tractor frame,
   wherein said wave generating means includes flapper means carried by the frame unit and extending in a laterally spaced serial arrangement longitudinally of the frame unit and the tractor,
   wherein said conveyors include endless chains that lie in upwardly and outwardly inclined planes and have bottom and top longitudinal reaches and front and rear vertical reaches and said fingers are carried by the links of the chains in contiguously adjoining fashion, and
   wherein said fingers are hingedly attached to the links of the chains and spring means is provided for normally retaining the fingers in laterally inwardly projecting relation with the chains.

7. The invention of claim 6 wherein the bottom reaches are disposed so that the fingers extend upwardly and inwardly therefrom to intrude into the plant structures beneath their crown portions and so that the fingers on one conveyor chain effect a closure relation with the fingers on the other conveyor chain beneath the crown portions of the plant structures so as to capture all of the falling fruit.

8. The invention of claim 7 wherein said tractor frame has vertical cam bars fixedly located at the front reaches of the conveyor chains so as to engage the passing fingers and incline them inwardly and thereby enlarge the passage for plant structures between the moving fingers on the opposing conveyor chains.

9. The invention of claim 8 wherein said storage means for the fruit is disposed vertically of the upper reaches of the conveyor chains at each side of the tractor frame and immediately inwardly of the rear vertical reaches and said fingers are in the form of elongated troughs having outer free tip ends and inner chain mounted ends provided with carrying cups and said carrying cups convey the fruit up the vertical rear reaches and deposit it by gravity into the storage means as the fingers are inverted in the turn of the chains from the vertical rear reaches to the top longitudinal reaches.

10. The invention of claim 9 wherein said storage means includes a series of vertically stepped removable boxes disposed in a cascade arrangement for overflow filling by the deposited fruit.

11. The invention of claim 9 and including air cleaning means disposed in communication with the storage means as the fruit is deposited therein by the inverted cups so as to clean debris from the fruit.

12. The invention of claim 9 and including a cam rod disposed above the storage means and under which the fingers pass and by means of which they are downwardly deflected so as to assist the gravitational fall of the fruit from the carrying cups into the storage means.

13. In a fruit harvester, means for dislodging mature fruit from a plant structure comprising a vertical series of oscillatory shafts of graduated lengths, a vertical series of arms of similar graduated lengths as the shafts and being longitudinally spaced from and in paired alignment with the shafts and elongated flexible strip-like elements connected between the paired shafts and arms.

14. The invention of claim 13 wherein said arms are fixed.

15. In a fruit harvester, means for dislodging mature fruit from a plant structure comprising a vertical series of oscillatory shafts of graduated lengths, a vertical series of arms of similar graduated lengths as the shafts and being longitudinally spaced from and in paired alignment with the shafts and elongated flexible strip-like elements connected between the paired shafts and arms,
wherein said arms are fixed, and
wherein said shafts have extensible lower end portions and at least one of the shafts has its lower end portion extended and a semi-rigid vibrating stub finger carried by said extended end portion of said shaft and directed towards and spaced from the arms.

16. In a fruit harvester having a tractor with a drive motor and a fruit detaching means for dislodging fruit from plant structures, means for catching and conveying the falling fruit including a pair of complementary vertically disposed and laterally spaced apart endless conveyor chains disposed on opposite sides of the fruit detaching means, fingers carried by the conveyor chains and extending laterally inwardly therefrom, said conveyor chains lying in upwardly and outwardly vertically inclined planes and having horizontal longitudinally extending bottom and top reaches and vertical front and rear reaches whereby the fingers in their travel with the bottom reaches are inclined upwardly with the fingers in such travel being in complementary closure relation intruding into the plant structure at the crown portion thereof and means connected between the tractor drive motor and the conveyor chains for driving the conveyor chains in synchronism with the ground travel of the tractor so that the fingers have an independent zero velocity with respect to the plant structures,
wherein said fingers are in the form of elongated troughs and have outer free tip ends and inner chain mounted ends provided with fruit carrying cups, and
wherein said inner ends are hingedly attached to the chains and spring loaded for normal positioning laterally of the paths of movement of the chains.

17. A harvester for harvesting fruit from a plant structure, such as a bush or tree, comprising a mobile frame adapted to move along a row of plant structures, means carried by said frame for generating a vibratory wave pattern over the plant structures to dislodge mature fruit therefrom, means carried by said frame for catching the falling fruit and conveying it up from the plant structures and a storage means carried by the frame and into which the fruit is deposited by the conveying means,
wherein said wave generating means includes flapper means carried by the frame unit and extending in a laterally spaced serial arrangement longitudinally of the frame unit and the tractor, and
wherein said flapper means includes a front vertical series of oscillatory actuation shafts and a rear vertical series of fixed arms carried by the frame unit and longitudinal flexible elements connected between the shafts and the arms with the elements having front ends attached to and excited by the oscillatory movements of the shafts and having rear ends fixedly held by the arms.

* * * * *